(12) United States Patent
Park

(10) Patent No.: US 12,345,944 B2
(45) Date of Patent: Jul. 1, 2025

(54) LENS DRIVING DEVICE

(71) Applicant: LG INNOTEK CO., LTD., Seoul (KR)

(72) Inventor: Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 900 days.

(21) Appl. No.: 17/439,632

(22) PCT Filed: Apr. 6, 2020

(86) PCT No.: PCT/KR2020/004638
§ 371 (c)(1),
(2) Date: Sep. 15, 2021

(87) PCT Pub. No.: WO2020/209562
PCT Pub. Date: Oct. 15, 2020

(65) Prior Publication Data
US 2022/0155651 A1    May 19, 2022

(30) Foreign Application Priority Data
Apr. 11, 2019    (KR) .................. 10-2019-0042600

(51) Int. Cl.
*G02B 7/04*    (2021.01)
*H04N 23/54*    (2023.01)
*H04N 23/55*    (2023.01)

(52) U.S. Cl.
CPC ............... *G02B 7/04* (2013.01); *H04N 23/54* (2023.01); *H04N 23/55* (2023.01)

(58) Field of Classification Search
CPC ........................................................ G02B 7/04
See application file for complete search history.

(56) References Cited

U.S. PATENT DOCUMENTS

| | | | |
|---|---|---|---|
| 2013/0088609 A1 | 4/2013 | Shimizu | |
| 2016/0103331 A1 | 4/2016 | Lee et al. | |
| 2016/0330375 A1 | 11/2016 | Sekimoto | |
| 2021/0063679 A1* | 3/2021 | Park | G03B 3/10 |

FOREIGN PATENT DOCUMENTS

| | | |
|---|---|---|
| CN | 104614836 A | 5/2015 |
| CN | 105900006 A | 8/2016 |
| CN | 109412303 A | 3/2019 |
| EP | 3 457 188 A1 | 3/2019 |
| JP | 2008-185913 A | 8/2008 |

(Continued)

OTHER PUBLICATIONS

KR 20150064471, translation (Year: 2015).*
WO 2017173648, translation (Year: 2017).*

*Primary Examiner* — Wen Huang
(74) *Attorney, Agent, or Firm* — Birch, Stewart, Kolasch & Birch, LLP

(57) ABSTRACT

The present embodiment relates to a lens driving device comprising: a cover comprising an upper plate, a side plate and an inner yoke; a base; a holder; a coil; a magnet; and a lateral elastic member, wherein the holder comprises a groove formed in the upper surface of the holder, and at least a portion of the inner yoke of the cover is inserted in the groove of the holder so that the holder engages with the inner yoke when the holder rotates.

15 Claims, 15 Drawing Sheets

(56) References Cited

FOREIGN PATENT DOCUMENTS

| | | |
|---|---|---|
| JP | 2017-67895 A | 4/2017 |
| KR | 10-2014-0011850 A | 1/2014 |
| KR | 10-2015-0064471 A | 6/2015 |
| KR | 10-2016-0041500 A | 4/2016 |
| KR | 10-2016-0057721 A | 5/2016 |
| KR | 10-2018-0127698 A | 11/2018 |
| KR | 10-2019-0014375 A | 2/2019 |
| WO | WO 2014/074250 A1 | 5/2014 |
| WO | WO-2017173648 A1 * | 10/2017 |
| WO | WO 2019/045339 A1 | 3/2019 |

* cited by examiner

LENS DRIVING DEVICE

CROSS REFERENCE TO RELATED APPLICATIONS

This application is the National Phase of PCT International Application No. PCT/KR2020/004638, filed on Apr. 6, 2020, which claims priority under 35 U.S.C. 119 (a) to Patent Application No. 10-2019-0042600, filed in the Republic of Korea on Apr. 11, 2019, all of which are hereby expressly incorporated by reference into the present application.

TECHNICAL FIELD

The present embodiment relates to a lens driving device

BACKGROUND ART 3D content is being applied not only in games and culture, but also in many fields such as education, manufacturing, and autonomous driving. In order to acquire 3D content, depth map is required. Depth information is information representing a distance in space, and represents perspective information of another point with respect to one point of a 2D image.

Recently, time of flight (TOF) is attracting attention as a method of acquiring depth information. According to the TOF method, the distance to the object is calculated by measuring the flight time, that is, the time the light is emitted and reflected. The biggest advantage of the ToF method is that it provides distance information in 3D space quickly in real time. In addition, the user can obtain accurate distance information without applying a separate algorithm or hardware correction. In addition, accurate depth information can be obtained even when measuring a very close subject or measuring a moving subject.

However, in the case of the current ToF method, there is a problem in that information that can be obtained per frame, that is, resolution is low.

In order to increase the resolution, the number of pixels of the sensor may be increased, but in this case, there is a problem in that the volume and manufacturing cost of the camera module are greatly increased.

DETAILED DESCRIPTION OF THE INVENTION

Technical Subject

An object of the present embodiment is to provide a lens driving device capable of increasing resolution by being used in the ToF method.

In particular, an object of the present invention is to provide a lens driving device capable of performing a super resolution (SR) technique.

Technical Solution

A lens driving device according to the present embodiment comprises: a cover comprising an upper plate, a lateral plate extending from an outer periphery of the upper plate, and an inner yoke extending from an inner periphery of the upper plate; a base coupled to the lateral plate of the cover; a holder spaced apart from the base; a coil disposed on the base; a magnet disposed on the holder and facing the coil; and a lateral elastic member movably connecting the holder to the base, wherein the holder may comprise a groove formed on an upper surface of the holder, and wherein at least a portion of the inner yoke of the cover may be inserted into the groove of the holder so that the holder is hung on the inner yoke when the holder rotates.

It comprises an upper elastic member coupled to the holder, wherein the lateral elastic member comprises a wire, wherein the upper elastic member comprises a first coupling portion comprising a hole coupled to the first protrusion of the holder, a second coupling portion comprising a hole through which the wire passes, and a connecting portion connecting the first coupling portion and the second coupling portion, and wherein one end of the wire may be coupled to the second coupling portion by a solder.

The wire comprises four wires so as to be disposed at each of the four corners of the holder, respectively, wherein the second coupling portion of the upper elastic member comprises four second coupling portions corresponding to the four wires, and wherein the upper elastic member may be integrally formed.

The holder comprises a hole through which the wire passes, and a second protrusion protruding from an upper surface of the holder and disposed between the groove of the holder and the hole of the holder, wherein the distance between the upper surface of the second protrusion of the holder and the upper plate of the cover is the shortest distance between the holder and the upper plate of the cover, and wherein a damper connecting the second coupling portion of the upper elastic member and the second protrusion of the holder may be disposed.

The lens driving device comprises: a first substrate comprising a body portion disposed on the base, and a terminal portion extending downward from an outer periphery of the body portion and comprising a plurality of terminals; and a second substrate disposed on the upper surface of the body portion of the first substrate and electrically connected to the first substrate, wherein the coil may be formed as a patterned coil on the second substrate.

It comprises a coupling member comprising a hole through which the wire passes and coupled to a lower surface of the base, wherein the base comprises a hole through which the wire passes, wherein the first substrate comprises a hole through which the wire passes, wherein the second substrate comprises a recess recessed inward from an outer periphery of the corner of the second substrate to avoid the wire, and wherein the other end of the wire may be coupled to the coupling member by a solder.

The holder comprises a protrusion protruding from a lateral surface of the holder, wherein the protrusions of the holder are formed by two on each of the four lateral surfaces of the holder, and wherein a distance between the protrusion of the holder and the lateral plate of the cover may be the shortest distance between the holder and the lateral plate of the cover.

The holder comprises a hole penetrating the holder in a direction parallel to the optical axis to expose an upper surface of the magnet, wherein a portion of the upper elastic member may have a shape corresponding to a shape of a portion of the hole of the holder.

The upper elastic member does not overlap with the groove of the holder in a direction parallel to the optical axis, wherein the holder may be integrally formed.

The lens driving device according to the present embodiment comprises: a cover comprising an upper plate, a lateral plate extending from an outer periphery of the upper plate, and an inner yoke extending from an inner periphery of the upper plate; a stator comprising a base coupled to the lateral plate of the cover and a coil disposed on the base; a mover comprising a holder spaced apart from the base, a magnet disposed on the holder and facing the coil, and an upper elastic member coupled to the holder; and a wire connecting the stator and the upper elastic member of the mover, wherein the holder comprises a groove formed on an upper surface of the holder, wherein the upper elastic member does not overlap with the groove of the holder in a direction parallel to the optical axis, and wherein at least a portion of the inner yoke of the cover may be inserted into the groove of the holder so that the holder is hung on the inner yoke when the holder rotates.

A camera device according to this embodiment comprises: a printed circuit board; a sensor disposed on the printed circuit board; a base disposed on the printed circuit board; a holder spaced apart from the base; a lens coupled to the holder; a coil disposed on the base; a magnet disposed on the holder and facing the coil; and a lateral elastic member connecting the holder to the base, wherein when a current is applied to the coil, the lens may be tilted with respect to the sensor.

The coil comprises a first coil and a second coil disposed opposite to each other with respect to the optical axis, wherein when a current is applied to the first coil and the second coil, a repulsive force is generated between the first coil and the magnet, and an attractive force may be generated between the second coil and the magnet.

The holder comprises a first side portion and a second side portion disposed opposite to each other, and a third side portion and a fourth side portion disposed opposite to each other, wherein the magnet comprises a first magnet disposed on the first side portion of the holder, a second magnet disposed on the second side portion of the holder, a third magnet disposed on the third side portion of the holder, and a fourth magnet disposed on the fourth side portion of the holder, wherein the coil comprises a first coil facing the first magnet, a second coil facing the second magnet, a third coil facing the third magnet, and a fourth coil facing the fourth magnet, wherein any one of attractive force and repulsive force is generated between the first coil and the first magnet, and the other one of attractive and repulsive force is generated between the second coil and the second magnet, and wherein any one of attractive force and repulsive force may be generated between the third coil and the third magnet, and the other one of attractive and repulsive force may be generated between the fourth coil and the fourth magnet.

A camera device according to this embodiment comprises: a printed circuit board; a sensor disposed on the printed circuit board; a base disposed on the printed circuit board; a holder spaced apart from the base; a lens coupled to the holder; a filter coupled to the holder and disposed under the lens; a coil disposed on the base; a magnet disposed on the holder and facing the coil; and a side portion elastic member for connecting the holder to the base, wherein when a current is applied to the coil, the lens and the filter may be tilted together with respect to the sensor.

Advantageous Effects

Through this embodiment, depth information can be acquired with high resolution without significantly increasing the number of pixels of the sensor.

In addition, a high-resolution image may be obtained from a plurality of low-resolution images obtained from the lens driving device according to the present embodiment through the SR technique.

BRIEF DESCRIPTION OF DRAWINGS

FIG. 17(a) is a first embodiment, and FIG. 17(b) is a second embodiment, and FIG. 17(c) is a third embodiment.

BEST MODE

Figure 1:
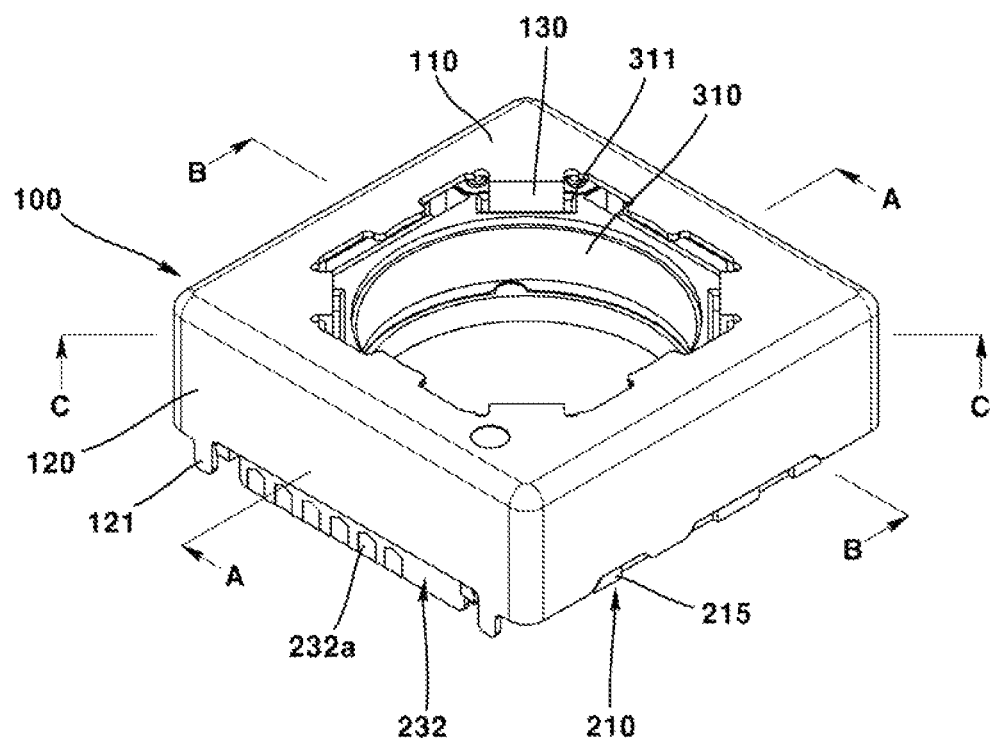
FIG. 1 is a perspective view of a lens driving device according to the present embodiment.

Hereinafter, preferred embodiments of the present invention will be described in detail with reference to the accompanying drawings.

However, the technical idea of the present invention is not limited to some embodiments to be described, but may be implemented in various forms, and if it is within the scope of the technical idea of the present invention, one or more of the components may be selected, combined, and substituted between the embodiments for use.

In addition, terms (comprising technical and scientific terms) used in the embodiments of the present invention are generally understood by those of ordinary skill in the technical field to which the present invention belongs unless explicitly defined and described, and it can be interpreted as a meaning, and terms generally used, such as terms defined in a dictionary, may be interpreted in consideration of the meaning in the context of the related technology.

In addition, terms used in the embodiments of the present invention are for describing the embodiments and are not intended to limit the present invention.

In the present specification, the singular form may comprise the plural form unless specifically stated in the phrase, and when described as "at least one (or more than one) of A and B and C", it may contain one or more of all combinations that can be combined with A, B, and C.

In addition, terms such as first, second, A, B, (a), (b), and the like may be used in describing the components of the embodiment of the present invention. These terms are only for distinguishing the component from other components, and are not limited to the nature, order, or sequence or the like of the component by the term.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when it is described as being formed or disposed in the "top (above) or bottom (below)" of each component, the top (above) or bottom (below) not only comprises a case when the two components are in direct contact with each other but also comprises a case where one or more other components are formed or disposed between the two components. In addition, when expressed as "top (above) or bottom (below)", the meaning of not only an upward direction but also a downward direction based on one component may be comprised.

Hereinafter, an optical apparatus according to the present embodiment will be described.

The optical apparatus may be any one of hand phones, portable phones, smart phones, portable smart devices, digital cameras, laptop computers, digital broadcasting terminals, personal digital assistants (PDAs), portable multimedia players (PMPs), and navigation. However, the type of the optical apparatus is not limited thereto, and any device for photographing an image or photograph may be comprised in the optical apparatus.

The optical apparatus may comprise a main body. The main body may be in the form of a bar. Or, the main body may have various structures, such as a slide type, a folder type, a swing type, and a swivel type in which two or more sub-bodies are coupled to be movable relative to each other. The main body may comprise a case (casing, housing, and cover) forming an outer appearance. For example, the main body may comprise a front case and a rear case. Various electronic components of the optical apparatus may be embedded in a space formed between the front case and the rear case.

The optical apparatus may comprise a display. The display may be disposed on one surface of the main body of the optical apparatus. The display may output an image. The display may output an image photographed by the camera.

The optical apparatus may comprise a camera. The camera may comprise a time of flight (ToF) camera device. The ToF camera device may be disposed in front of the main body of the optical apparatus. In this case, the ToF camera device may be used for various types of biometric recognition such as face recognition and iris recognition of a user for security authentication of the optical apparatus.

Hereinafter, the configuration of a ToF camera device according to the present embodiment will be described with reference to the drawings.

Figure 18:
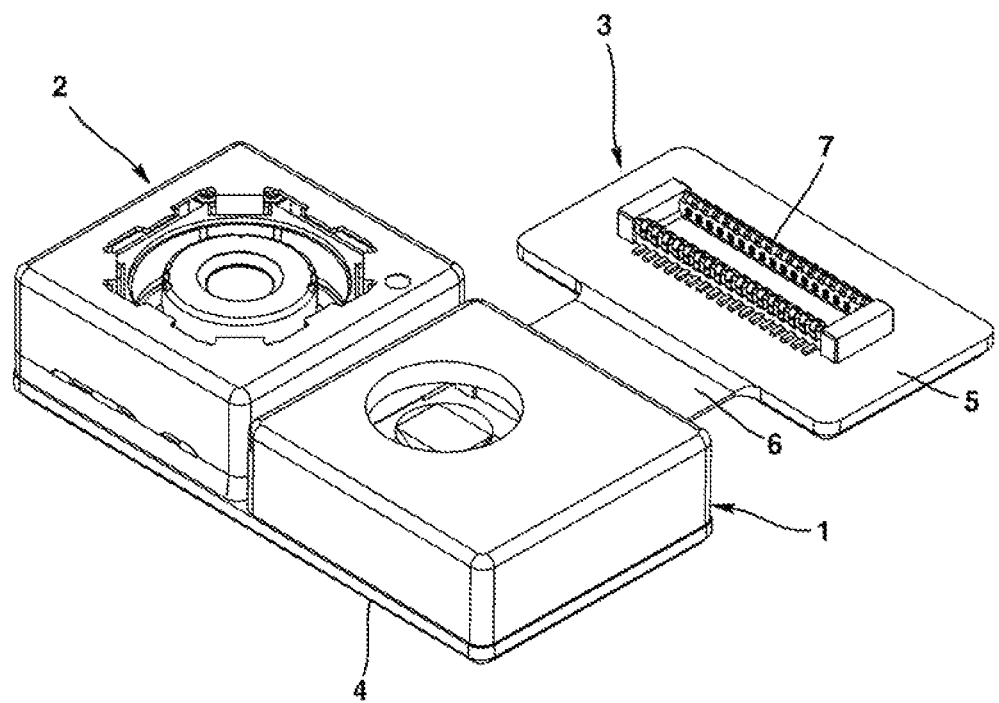
FIG. 18 is a perspective view of a ToF camera device according to the present embodiment.

FIG. 18 is a perspective view of a ToF camera device according to the present embodiment.

The ToF camera device may comprise a camera device. The ToF camera device may comprise a camera module.

The camera module may comprise a light emitting unit 1. The light emitting unit 1 may be a light emitting module, a light emitting unit, a light emitting assembly, or a light emitting device. The light emitting unit 1 may generate an output light signal and then irradiate an object. In this case, the light emitting unit 1 may generate and output an output light signal in the form of a pulse wave or a continuous wave. The continuous wave may be in the form of a sinusoid wave or a square wave. By generating an output light signal in the form of a pulse wave or a continuous wave, ToF camera device may detect a phase difference between the output light signal outputted from the light emitting unit 1 and the input light signal inputted to the light receiving unit 2 of the ToF camera device after being reflected from an object can be detected. In this specification, an output light means a light outputted from the light emitting unit 1 and incident on the object, and the input light may refer to a light outputted from the light emitting unit 1, reaching the object, reflected from the object, and inputted to the ToF camera device. From the object's point of view, the output light may be an incident light, and the input light may be a reflected light. The light emitting unit 1 irradiates the generated output light signal to an object for a predetermined exposure period (integration time). Here, the exposure period means one frame period. In the case of generating a plurality of frames, the set exposure period is repeated. For example, when the ToF camera device photographs an object at 20 FPS, the exposure period is ¹⁄₂₀ seconds. And when 100 frames are generated, the exposure period may be repeated 100 times.

The light emitting unit 1 may generate a plurality of output light signals having different frequencies. The light emitting unit 1 may sequentially and repeatedly generate a plurality of output light signals having different frequencies. Alternatively, the light emitting unit 1 may simultaneously generate a plurality of output light signals having different frequencies.

The light emitting unit 1 may comprise a light source. A light source may generate light. The light source may output light. The light source may irradiate light. The light generated by the light source may be infrared rays having a wavelength of 770 to 3000 nm. Alternatively, the light generated by the light source may be visible light having a wavelength of 380 to 770 nm. The light source may comprise a light emitting diode (LED). The light source may comprise a plurality of light emitting diodes arranged according to a predetermined pattern. In addition, the light source may comprise an organic light emitting diode (OLED) or a laser diode (LD).

The light emitting unit 1 may comprise a light modulation unit for modulating light. The light source may generate an output light signal in the form of a pulse wave or a continuous wave by repeating flickering (on/off) at regular time intervals. The predetermined time interval may be the frequency of the output light signal. The blinking of the light source may be controlled by the light modulation unit. The light modulation unit may control the blinking of the light source so that the light source generates an output light signal in the form of a continuous wave or a pulse wave. The light modulation unit may control the light source to generate an output light signal in the form of a continuous wave or a pulse wave through frequency modulation, pulse modulation, or the like.

The light emitting unit 1 may comprise a diffuser. The diffuser may be a diffuser lens. The diffuser may be disposed in front of the light source. The light emitted from the light source may pass through the diffuser and be incident on an object. The diffuser may change the path of light emitted from the light source. The diffuser may condense the light emitted from the light source.

The light emitting unit 1 may comprise a cover. The cover may be disposed to cover the light source. The cover may be disposed on a printed circuit board 4. The cover may comprise an upper plate comprising a hole, and a lateral plate extending from the upper plate.

The camera module may comprise a light receiving unit 2. The light receiving unit 2 may be a light receiving module, a light receiving unit, a light receiving assembly, or a light receiving device. The light receiving unit 2 may detect light emitted from the light emitting unit 1 and reflected from the object. The light receiving unit 2 may generate an input light signal corresponding to the output light signal outputted from the light emitting unit 1. The light receiving unit 2 may be disposed side by side with the light emitting unit 1. The light receiving unit 2 may be disposed next to the light emitting unit 1. The light receiving unit 2 may be disposed in the same direction as the light emitting unit 1.

The light receiving unit 2 may comprise a lens module. The light reflected from an object may pass through the lens module. The optical axis of the lens module and the optical axis of the sensor may be aligned. The lens module may be coupled to a holder 310. The lens module may be fixed to the holder 310. The lens module may be coupled to the holder 310 to move integrally with the holder 310. The lens module may be shifted. The lens module may be tilted. The lens module may be moved to adjust the optical path. The lens module may change the path of light incident to the sensor through movement. The lens module may change the angle of field of view (FOV) or the direction of FOV and the like of the incident light.

The light receiving unit 2 may comprise a filter. The filter may be coupled to the base 210. The filter may be disposed between the lens module and the sensor. A filter may be disposed on the optical path between the object and the sensor. The filter may filter light having a predetermined wavelength range. A filter can pass light of a specific wavelength. That is, the filter may block by reflecting or absorbing light other than a specific wavelength. The filter may pass infrared rays and block light of wavelengths other than the infrared rays. Alternatively, the filter may pass visible light and block light of a wavelength other than the visible light. The filter may be moved. The filter may be fixed to the base 210. The filter may be coupled to a sensor base (not shown) separate from the base 210. In a modified embodiment, the filter may be moved while being coupled to the holder 310.

The light receiving unit 2 may comprise a sensor. The sensor may sense light. The sensor may detect a light and output it as an electrical signal. The sensor may detect a light having a wavelength corresponding to the wavelength of a light outputted from the light source. The sensor can detect an infrared light. Alternatively, the sensor may detect a visible light.

The sensor may comprise: a pixel array that receives the light passing through the lens module and converts it into an electrical signal corresponding to the light; a driving circuit for driving a plurality of pixels comprised in the pixel array; and a readout circuit that reads the analog pixel signal of each pixel. The readout circuit may generate a digital pixel signal (or an image signal) through analog-to-digital conversion by comparing the analog pixel signal with a reference signal. Here, the digital pixel signal of each pixel comprised in the pixel array constitutes an image signal, and as the video signal is transmitted in frame units, it can be defined as an image frame. That is, the image sensor may output a plurality of image frames.

The light receiving unit 2 may comprise an image synthesizing unit. The image synthesizing unit may comprise an image processor that receives an image signal from a sensor and processes the image signal (e.g., interpolation, frame synthesis, and the like). In particular, the image synthesizing unit may synthesize the image signals (low resolution) of a plurality of frames into an image signal (high resolution) of one frame. That is, the image synthesizing unit may synthesize a plurality of image frames comprised in the image signal received from the sensor, and generate the synthesized result as a synthesized image. The composite image generated by the image synthesizing unit may have a higher resolution than a plurality of image frames output from the sensor. That is, the image synthesizing unit can generate a high-resolution image through a super resolution (SR) technique. The image synthesizing unit may generate a high-resolution image through SR technology. The image synthesizing unit may generate a high-resolution image through a high-resolution operation. The plurality of image frames may comprise image frames generated to have different optical paths from one another by the movement of the filter.

The camera module may comprise a printed circuit board (PCB) 4. The light emitting unit 1 and the light receiving unit 2 may be disposed on the printed circuit board 4. The printed circuit board 4 may be electrically connected to the light emitting unit 1 and the light receiving unit 2.

The camera module may comprise a coupling portion 3. The coupling portion 3 may be electrically connected to the printed circuit board 4. The coupling portion 3 may be connected to a configuration of an optical apparatus. The coupling portion 3 may comprise a connector 7 that is connected to a component of an optical apparatus. The coupling portion 3 may comprise a substrate 5 on which a connector 7 is disposed and connected to the connecting portion 6. The substrate 5 may be a PCB.

The camera module may comprise a connecting portion 6. The connecting portion 6 may connect the printed circuit board 4 and the coupling portion 3. The connecting portion 6 may have flexibility. The connecting portion 6 may be a flexible printed circuit board (FPCB).

The camera module may comprise a lens driving device.

Hereinafter, the configuration of the lens driving device according to the present embodiment will be described with reference to the drawings.

Figure 2:
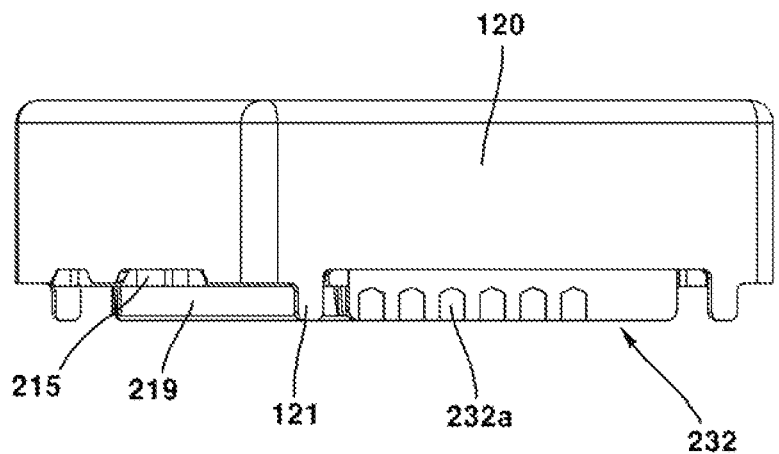
FIG. 2 is a view of a lens driving device according to the present embodiment.
Figure 3:
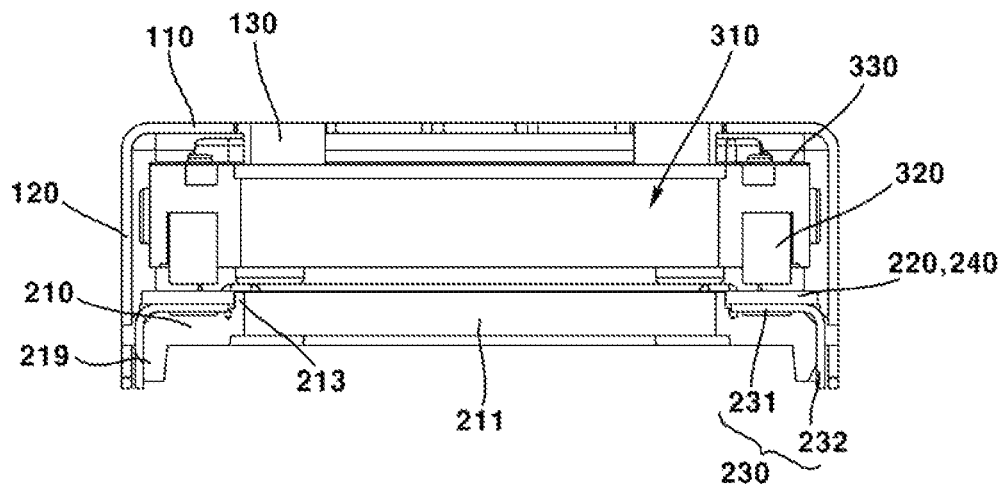
FIG. 3 is a cross-sectional view of a lens driving device according to the present embodiment as viewed from line A-A of FIG. 1.
Figure 4:
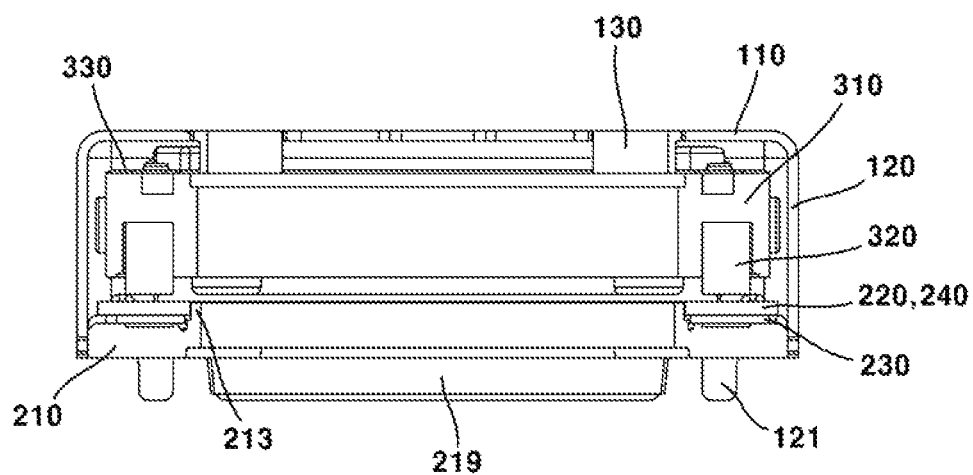
FIG. 4 is a cross-sectional view of a lens driving device according to the present embodiment as viewed from line B-B of FIG. 1.
Figure 5:
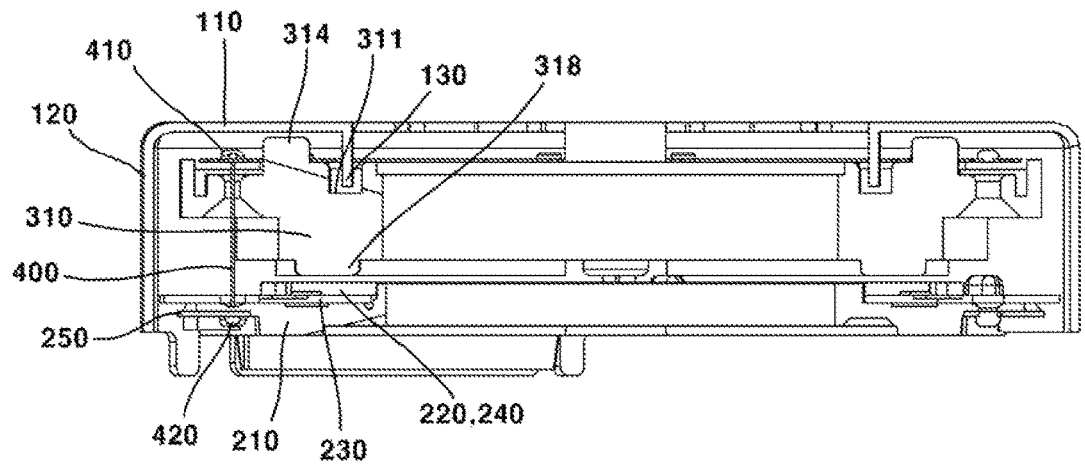
FIG. 5 is a cross-sectional view of a lens driving device according to the present embodiment viewed from line C-C of FIG. 1.
Figure 6:
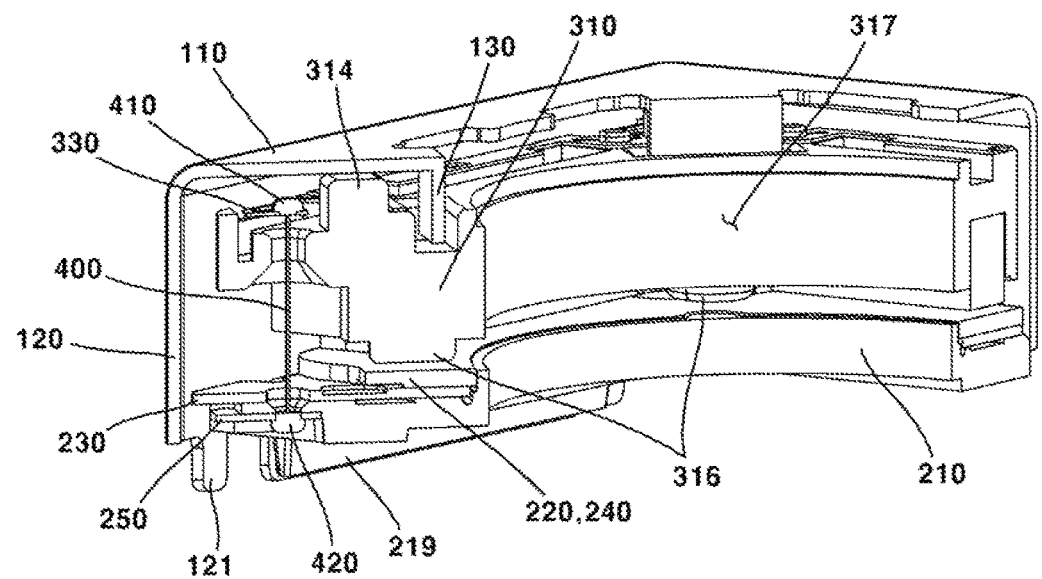
FIG. 6 is a cross-sectional perspective view of a lens driving device according to the present embodiment.
Figure 7:
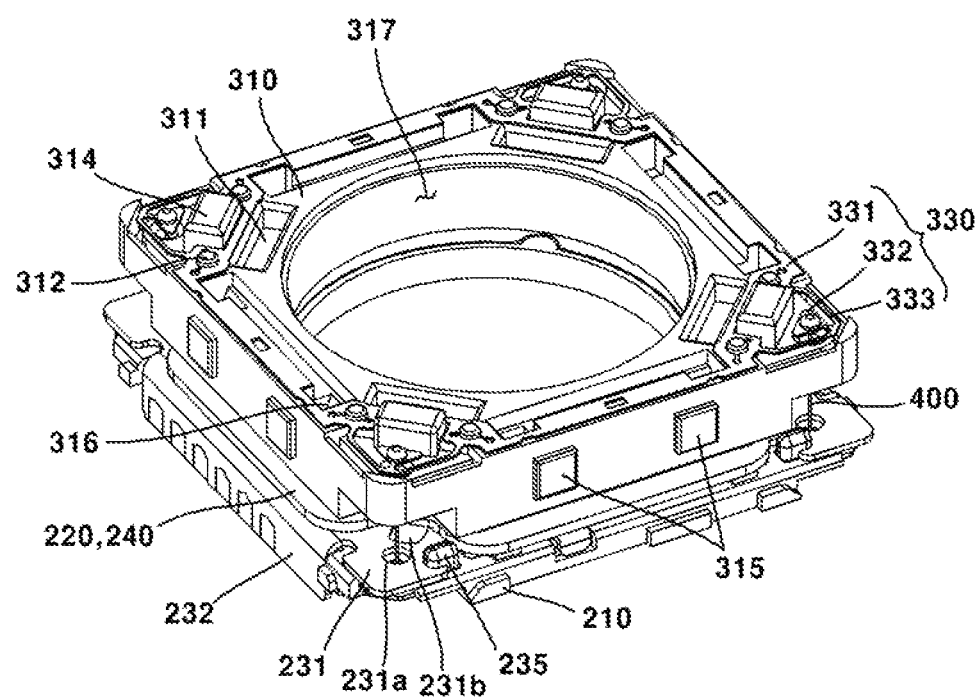
FIG. 7 is a perspective view illustrating a lens driving device according to the present embodiment with the cover removed.
Figure 8:
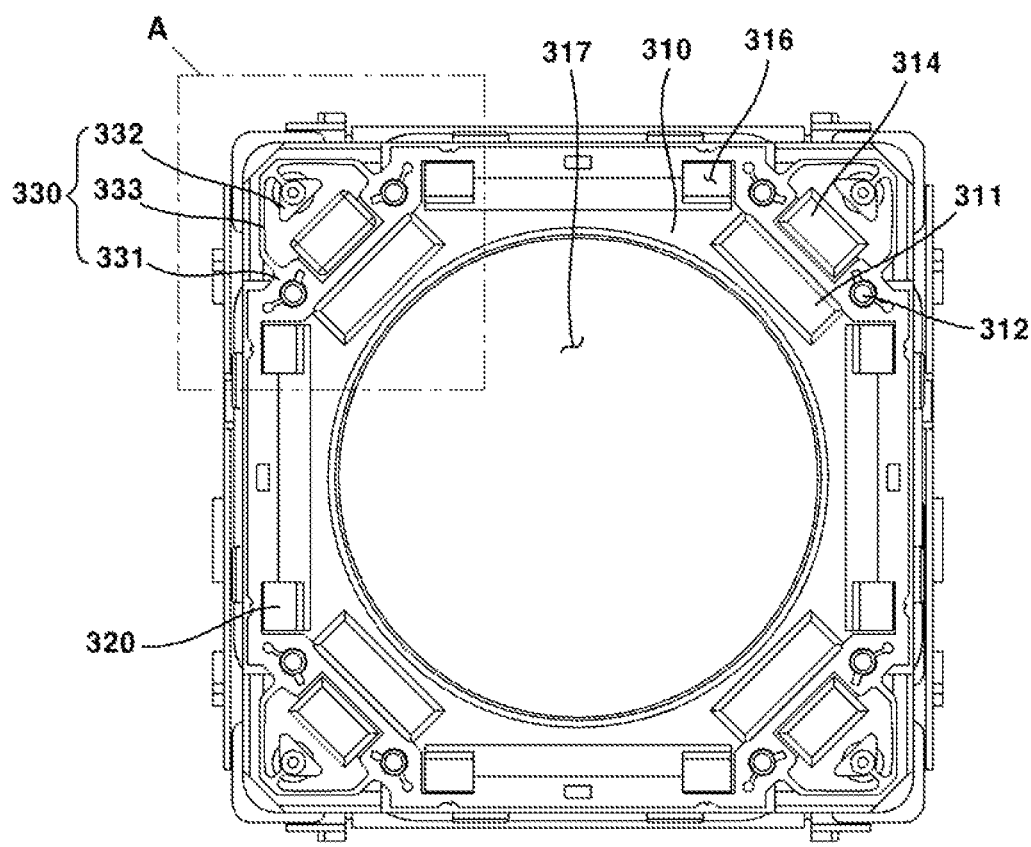
FIG. 8 is a plan view illustrating a lens driving device according to the present embodiment with the cover removed.
Figure 9:
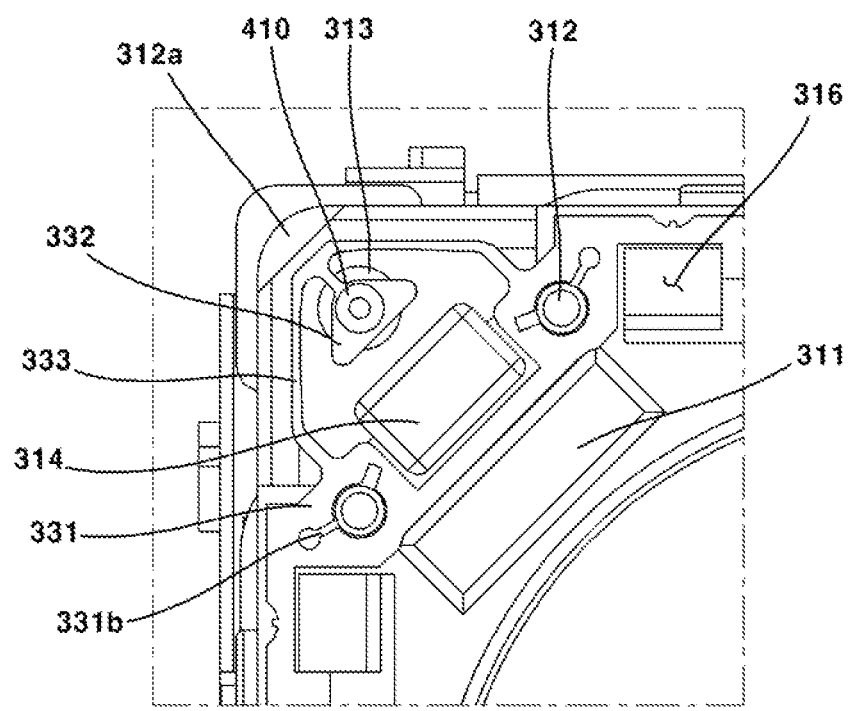
FIG. 9 is an enlarged view illustrating a portion A of FIG. 8.
Figure 10:
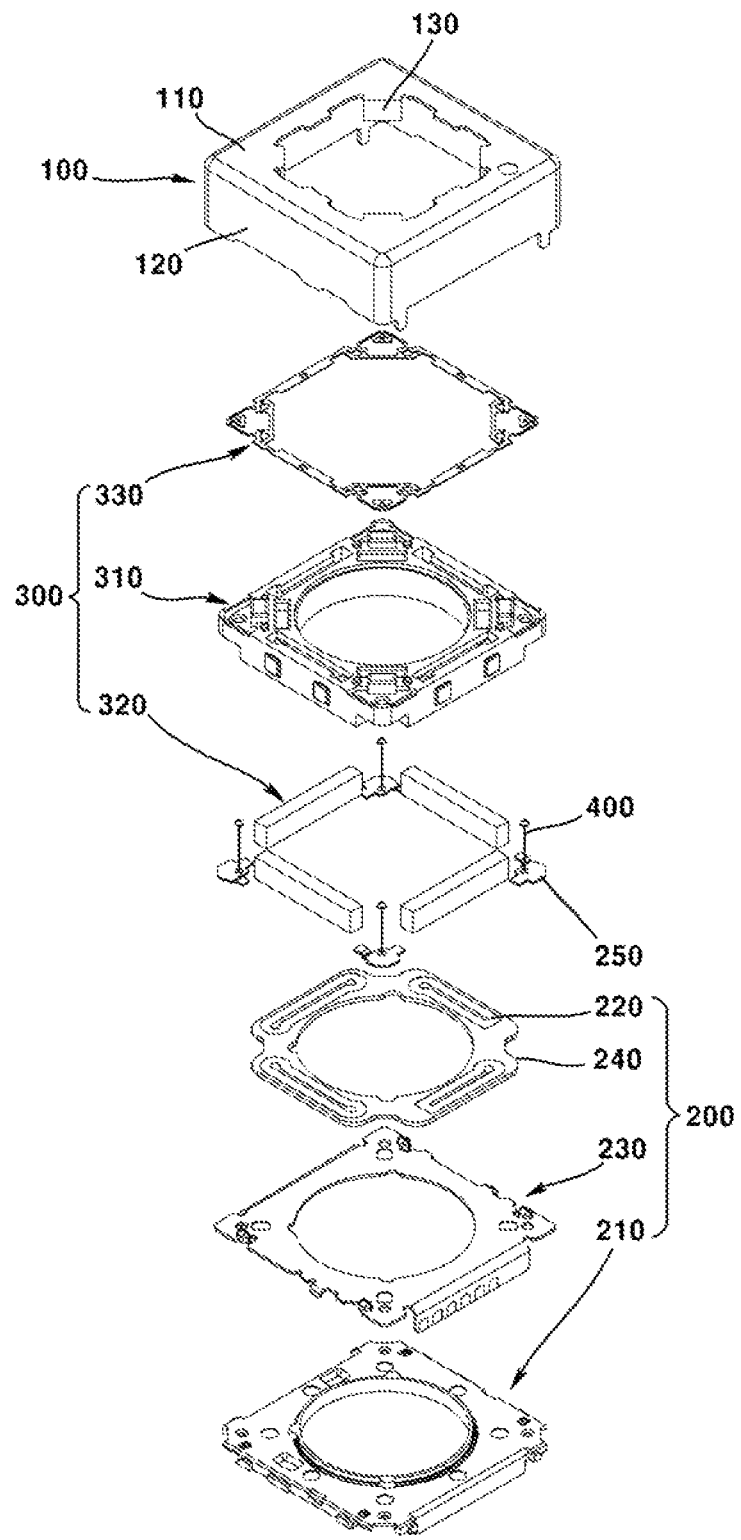
FIG. 10 is an exploded perspective view of a lens driving device according to the present embodiment.
Figure 11:
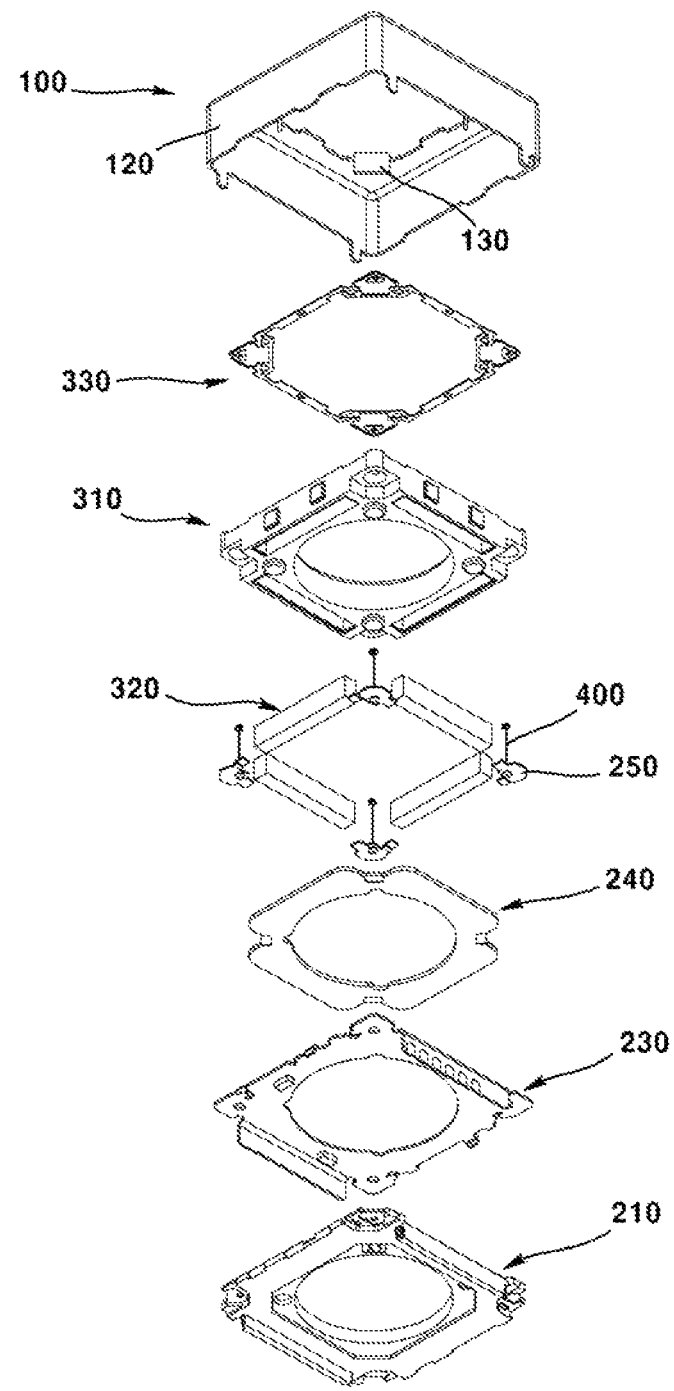
FIG. 11 is a bottom exploded perspective view of a lens driving device according to the present embodiment.
Figure 12:
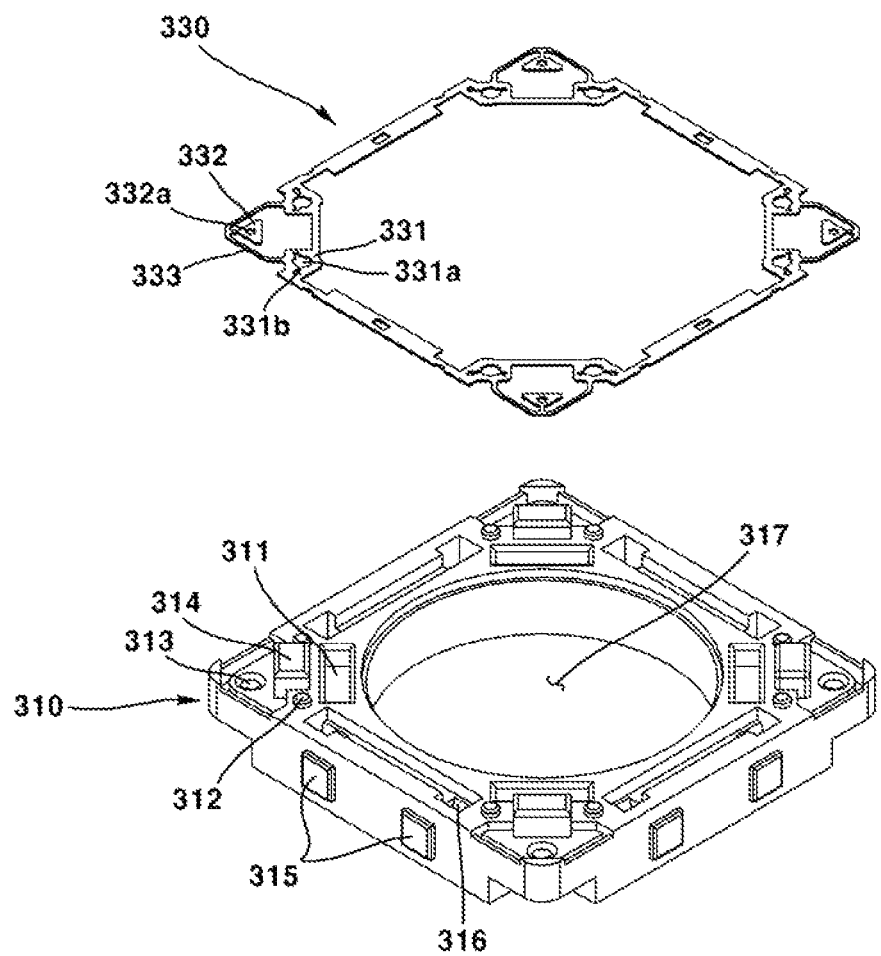
FIG. 12 is an exploded perspective view of a partial configuration of a lens driving device according to the present embodiment.
Figure 13:
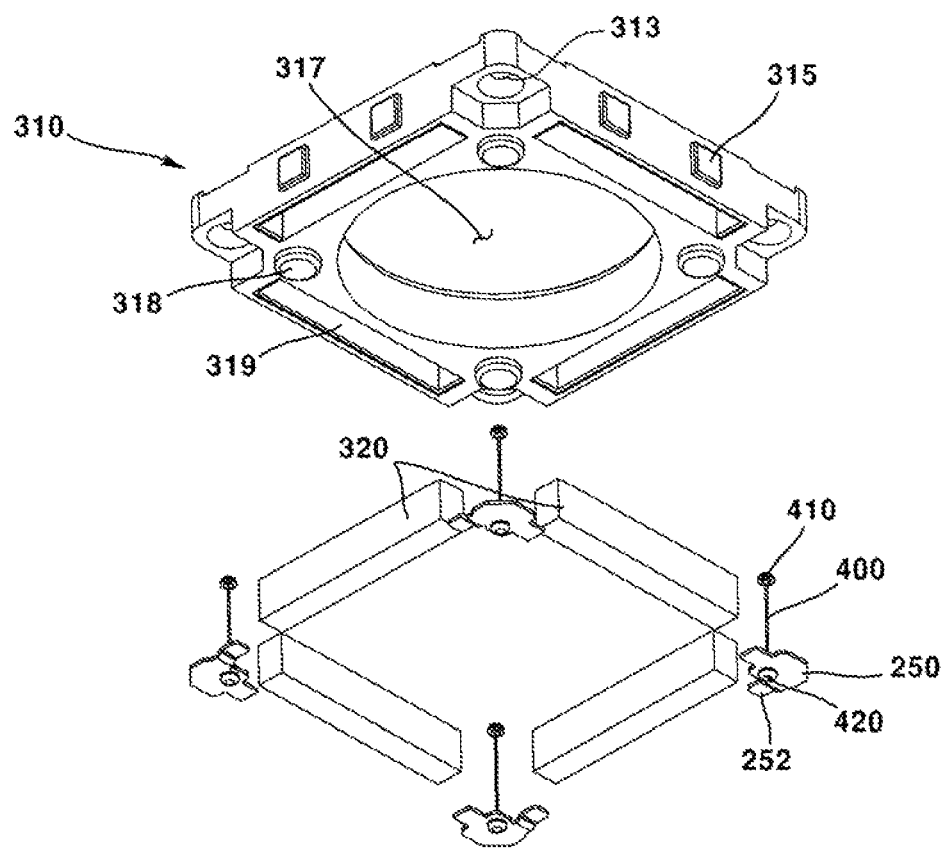
FIG. 13 is a bottom exploded perspective view of a partial configuration of a lens driving device according to the present embodiment.
Figure 14:
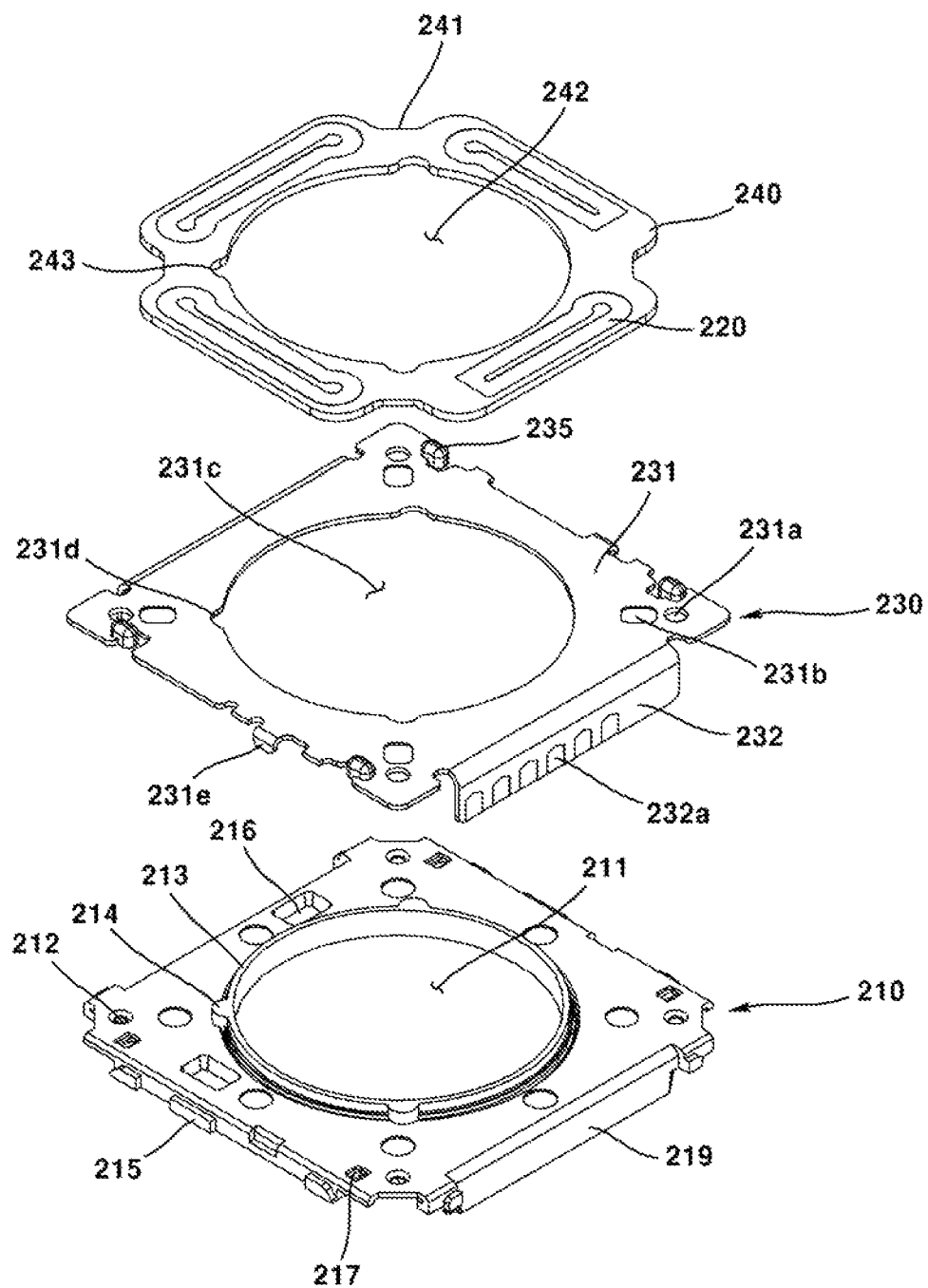
FIG. 14 is an exploded perspective view of a partial configuration of a lens driving device according to the present embodiment.
Figure 15:
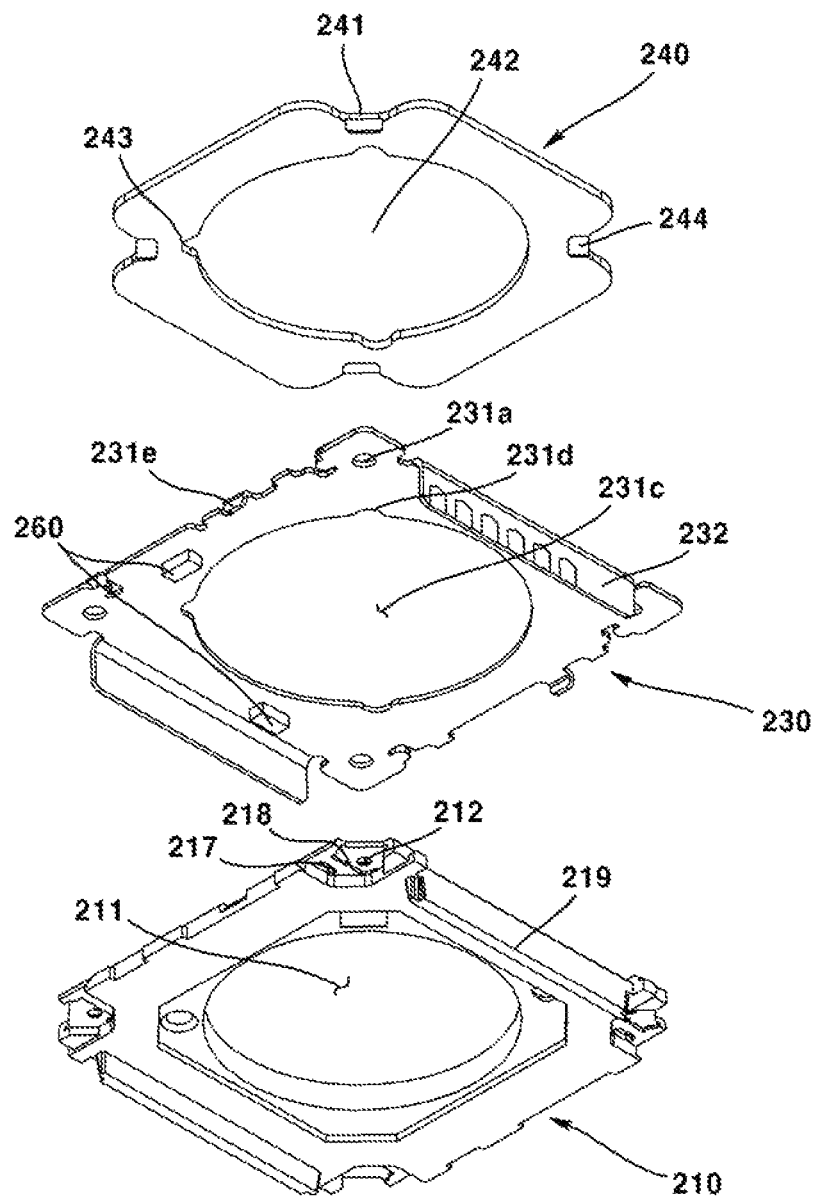
FIG. 15 is a bottom exploded perspective view of a partial configuration of a lens driving device according to the present embodiment.
Figure 16:
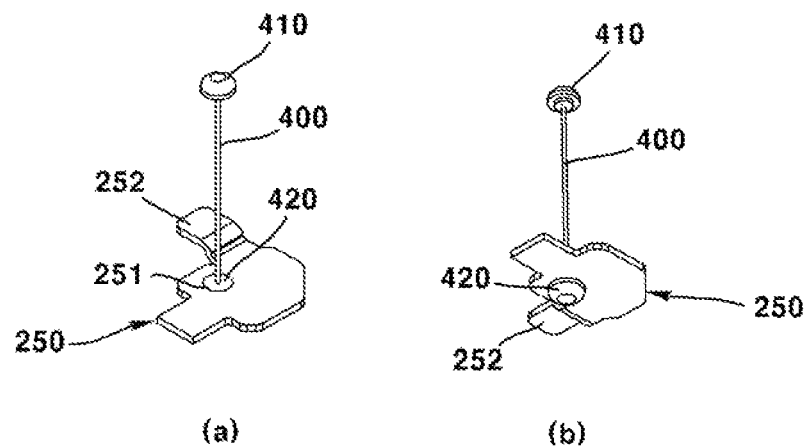
FIG. 16(a) is a perspective view illustrating a side portion elastic member of a lens driving device according to the present embodiment and its related configuration.
FIG. 16(b) is a bottom perspective view illustrating a side portion elastic member of a lens driving device according to the present embodiment and its related configuration.

FIG. 1 is a perspective view of a lens driving device according to the present embodiment, FIG. 2 is a view of a lens driving device according to the present embodiment, FIG. 3 is a cross-sectional view of a lens driving device according to the present embodiment as viewed from line A-A of FIG. 1, FIG. 4 is a cross-sectional view of a lens driving device according to the present embodiment as viewed from line B-B of FIG. 1, FIG. 5 is a cross-sectional view of a lens driving device according to the present embodiment viewed from line C-C of FIG. 1, FIG. 6 is a cross-sectional perspective view of a lens driving device according to the present embodiment, FIG. 7 is a perspective view illustrating a lens driving device according to the present embodiment with the cover removed, FIG. 8 is a plan view illustrating a lens driving device according to the present embodiment with the cover removed, FIG. 9 is an enlarged view illustrating a portion A of FIG. 8, FIG. 10 is an exploded perspective view of a lens driving device according to the present embodiment, FIG. 11 is a bottom exploded perspective view of a lens driving device according to the present embodiment, FIG. 12 is an exploded perspective view of a partial configuration of a lens driving device according to the present embodiment, FIG. 13 is a bottom exploded perspective view of a partial configuration of a lens driving device according to the present embodiment, FIG. 14 is an exploded perspective view of a partial configuration of a lens driving device according to the present embodiment, FIG. 15 is a bottom exploded perspective view of a partial configuration of a lens driving device according to the present embodiment, FIG. 16(*a*) is a perspective view illustrating a side portion elastic member of a lens driving device according to the present embodiment and its related configuration, and FIG. 16(*b*) is a bottom perspective view illustrating a side portion elastic member of a lens driving device according to the present embodiment and its related configuration.

The lens driving device may comprise a voice coil motor (VCM). The lens driving device may comprise a lens driving motor. The lens driving device may comprise a lens driving actuator.

Functions such as optical image stabilization (OIS) and 3D are being added to strengthen the functions of mobile phones. In particular, 3D requires development to increase resolution. There is a method of increasing resolution by interpolating (adding data) using S/W, but resolution correction using S/W has a limit, so the present embodiment proposes an invention that makes higher resolution by combining mechanical movement and S/W.

In ToF, a lens drive device capable of driving a lens that can increase resolution based on additional information while shifting the lens to a specific position is required in the light emitting unit 1 or the light receiving unit 2, and to this end, the present embodiment may comprise details on this.

As 5G progresses and video calls, SNS, and the like using the front camera become common, it is necessary to improve the picture quality of the front unit. This embodiment may comprise details for solving this problem, and may comprise details of invention to be suitable for miniaturized OIS.

In the present embodiment, the resolution can be increased by creating additional data using mechanical motion. A closed loop auto focus (CLAF) function using a position element may be added to the present embodiment. In this case, CLAF may be implemented by using a position element integrated driver IC. In this embodiment, an inner yoke 130 may be applied to suffice the impact reliability.

In a lens driving device according to the present embodiment, a magnet 320 is assembled to a driving body (mover 300), and a coil 220 and the position element (sensor 260) may be fixed to a fixing unit (stator 200). In the lens driving device, the driving body may be moved left and right (horizontal direction). The lens driving device of the present embodiment may comprise an actuator and an algorithm that sequentially move to four values of predetermined positions.

The lens driving device may comprise a cover 100. The cover 100 may be a bracket. The cover 100 may comprise a 'cover can'. The cover 100 may be disposed to surround the holder 310. The cover 100 may be coupled to the base 210. The cover 100 may accommodate the holder 310 therein. The cover 100 may form the outer appearance of the lens driving device. The cover 100 may have a hexahedral shape with an open lower surface. The cover 100 may be a non-magnetic material. The cover 100 may be formed of metal. The cover 100 may be formed of a metal plate. A protrusion 121 of the cover 100 may be connected to the ground portion of the printed circuit board 4 through solder. Through this, the cover 100 may be grounded. The cover 100 may block electromagnetic interference (EMI). In this case, the cover 100 may be referred to as an 'EMI shield can'. The cover 100 is a finally assembled component and may protect the product from external impact. The cover 100 may be formed of a material having a thin thickness and high strength.

The cover 100 may comprise an upper plate 110. The cover 100 may comprise a lateral plate 120. The cover 100 may comprise an upper plate 110 and a lateral plate 120 extending from an outer periphery of the upper plate 110. The cover 100 may comprise an upper plate 110 comprising a hole, and a lateral plate 120 extending downward from an outer periphery or edge of the upper plate 110. The upper plate 110 of the cover 100 may comprise a hole corresponding to the hole 317 of the holder 310. A lower end of the lateral plate 120 of the cover 100 may be disposed on a step portion 215 of the base 210. An inner surface of the lateral plate 120 of the cover 100 may be fixed to the base 210 by an adhesive. The lateral plate 120 of the cover 100 may comprise a plurality of lateral plates. The plurality of lateral plates may comprise first to fourth lateral plates. The lateral plate 120 of the cover 100 may comprise a first lateral plate and a second lateral plate disposed opposite to each other, and a third lateral plate and a fourth lateral plate disposed opposite to each other between the first lateral plate and the second lateral plate.

The cover 100 may comprise an inner yoke 130. The cover 100 may comprise an inner yoke 130 extending from the inner periphery of the upper plate 110. At least a portion of the inner yoke 130 may be inserted into a groove 311 of the holder 310. At least a portion of the inner yoke 130 may be disposed in the groove 311 of the holder 310. Through this, when the holder 310 rotates, the holder 310 may be hung on the inner yoke 130. That is, the rotation of the holder 310 may be limited to a specific angle or less by the coupling structure of the groove 311 of the holder 310 and the inner yoke 130. The inner yoke 130 may be overlapped with the holder 310 in a circumferential direction of a virtual circle centered on the optical axis. The inner yoke 130 may be provided to suffice the impact reliability and for the convenience sake during lens assembly.

The inner yoke 130 may comprise a plurality of inner yokes. The inner yoke 130 may comprise four inner yokes. The inner yoke 130 may comprise first to fourth inner yokes.

The inner yoke 130 may be spaced apart from the holder 310 by 80 to 200 μm in a vertical direction (height direction). The inner yoke 130 may be spaced apart from the holder 310 by 80 to 200 μm inward and outward.

The lens driving device may comprise a stator 200. The stator 200 may be a fixed part when the mover 300 moves. The stator 200 may always be maintained in a fixed state with respect to the sensor disposed on the printed circuit board 4.

The stator 200 may comprise a base 210. It may be coupled with the lateral plate 120 of the cover 100. The base 210 may be disposed under the holder 310. The base 210 may be spaced apart from the holder 310. The base 210 may be coupled to a lateral elastic member 400. A filter may be coupled to the base 210.

The base 210 may comprise a hole 211. The hole 211 may be a hollow hole penetrating the central portion of the base 210 in the optical axis direction. The hole 211 may penetrate the central portion of the base 210 in the optical axis direction. A filter may be disposed in the hole 211.

The base 210 may comprise a hole 212. The hole 212 may be a wire through hole through which a wire passes. A wire may pass therethrough the hole 212. The hole 212 may be formed with a diameter larger than the diameter of the wire.

The base 210 may comprise a protrusion 213. The protrusion 213 may be formed on an upper surface of the base 210. The protrusion 213 may be formed along the inner circumferential surface of the base 210. The protrusion 213 may support inner circumferential surfaces of the first substrate 230 and the second substrate 240. The upper surface of the protrusion 213 may be disposed at a height corresponding to the upper surface of the second substrate 240 or disposed higher than the upper surface of the first substrate 230. That is, the protrusion 213 may be formed at a height corresponding to the second substrate 240 or may be protruded further than the first substrate 230.

The base 210 may comprise a protrusion 214. The protrusion 214 may be protruded outward from the protrusion 213. The protrusion 214 may be protruded from an upper surface of the base 210. The protrusion 214 may prevent the rotation of the first substrate 230 and the second substrate 240 through the coupling structure of the first substrate 230 and the second substrate 240. It can also serve as a reference point for assembly. The protrusion 214 may comprise a plurality of protrusions. Three protrusions 214 may be provided.

The base 210 may comprise a stepped portion 215. The lateral plate 120 of the cover 100 may be disposed on the stepped portion 215 of the base 210. The step portion 215 may be protruded from a lateral surface of the base 210. A step may be formed on a lateral surface of the base 210 by the step portion 215.

The base 210 may comprise a groove 216. The groove 216 may be a Hall sensor accommodating groove in which the Hall sensor is disposed. The groove 216 may be formed in a shape corresponding to the sensor 260. The groove 216 may comprise a plurality of grooves. The groove 216 may comprise two grooves for accommodating two sensors 260.

The base 210 may comprise a hole 217. The hole 217 may be a solder placement hole formed in the base 210 separately from the hole 212 through which a wire passes and in which solder is disposed. The hole 217 may penetrate through the base 210 in a direction parallel to the optical axis. The solder disposed in the hole 217 may be connected to the coupling member 250.

The base 210 may comprise a groove 218. The groove 218 may be a coupling member accommodating groove in which the coupling member 250 is disposed. At least a portion of the groove 218 may be formed to have a shape corresponding to at least a portion of the coupling member 250. However, the coupling member 250 may be integrally formed with the base 210 through an insert.

The base 210 may comprise a protrusion 219. The protrusion 219 may be a terminal support portion supporting a terminal portion 232 of the first substrate 230. The protrusion 219 may be protruded from a lower surface of the base 210. The protrusion 219 may be protruded to a length corresponding to the terminal 232 of the first substrate 230.

The stator 200 may comprise a coil 220. The coil 220 may be disposed on the base 210. The coil 220 may be disposed between the magnet 320 and the base 210. The coil 220 may be formed as a pattern coil on the second substrate 240. The coil 220 may be formed as a fine pattern coil on the second substrate 240. At this time, the second substrate 240 may be formed of an FPCB. The coil 220 may face the magnet 320. The coil 220 may be disposed to face the magnet 320. The coil 220 may electromagnetically interact with the magnet 320. When a current is supplied to the coil 220 to form an electromagnetic field around the coil 220, the magnet 320 may move with respect to the coil 220 by electromagnetic interaction between the coil 220 and the magnet 320.

The coil 220 may comprise a plurality of coils. The coil 220 may comprise four coils. The coil 220 may comprise first to fourth coils. Two of the four coils may be used to move the mover 300 in the x-axis direction. At this time, the two coils may be electrically connected. The other two coils among the four coils may be used to move the mover 300 in the y-axis direction. Meanwhile, when four coils are used at the same time, the mover 300 may be moved in a diagonal direction. In this case, the two coils may be electrically connected. Meanwhile, the coil for moving the mover 300 in the x-axis direction and the coil for moving the mover 300 in the y-axis direction may not be connected to each other. As a modified embodiment, a plurality of coils may be disposed in a diagonal direction. Forward current and reverse current may be selectively applied to each of the plurality of coils.

The stator 200 may comprise a first substrate 230. The first substrate 230 may comprise a flexible printed circuit board (FPCB). The first substrate 230 may electrically connect the coil 220 and the printed circuit board 4 to each other.

The first substrate 230 may comprise a body portion 231. The body portion 231 may be disposed on the base 210. The body portion 231 may be disposed on an upper surface of the base 210. The body portion 231 may be disposed between the base 210 and the second substrate 240.

The body portion 231 may comprise a hole 231a. The hole 231a may be a wire through hole through which a wire passes. A wire may pass through the hole 231a. The diameter of the hole 231a may be larger than the diameter of the wire.

The body portion 231 may comprise a terminal 231b. The terminal 231b may be formed on an upper surface of the body portion 231. The terminal 231b of the first substrate 230 may be electrically connected to the terminal 244 of the second substrate 240. The terminal 231b of the first substrate 230 may be coupled to the terminal 244 of the second substrate 240 by a conductive material.

The body portion 231 may comprise a hole 231c. The hole 231c may be a hollow hole penetrating the central portion of the body portion 231 in the optical axis direction. The hole 231c may be formed with a diameter corresponding to the protrusion 213 of the base 210.

The body portion 231 may comprise a groove 231d. The groove 231d may be formed on an inner circumferential surface of the hole 231c. The groove 231d of the first substrate 230 may be formed in a shape corresponding to the protrusion 214 of the base 210. The groove 231d of the first substrate 230 may be structure-coupled with the protrusion 214 of the base 210 to prevent rotation of the first substrate 230 with respect to the base 210.

The first substrate 230 may comprise a terminal portion 232. The terminal portion 232 may be extended downward from an outer periphery of the body portion 231. The terminal portion 232 may comprise two terminal portions, one on both sides of the body portion 231.

The terminal unit 232 may comprise a terminal 232a. The terminal 232a may be electrically connected to a terminal of the printed circuit board 4. The terminal 232a may comprise a plurality of terminals. The plurality of terminals may comprise first and second terminals. The first and second terminals may be two (+) terminals and (−) terminals of the coil input terminals for x-axis movement of the mover 300. The plurality of terminals may comprise third to sixth terminals. The third to sixth terminals may correspond to four terminals of two input and output terminals of a Hall element, which is the sensor 260 for detecting the x-axis movement of the mover 300. The first to sixth terminals may be formed on any one of the two terminal units 232. The plurality of terminals may comprise seventh and eighth terminals. The seventh and eighth terminals may be a (+) terminal and a (−) terminal of two coil input terminals for y-axis movement of the mover 300. The plurality of terminals may comprise ninth to twelfth terminals. The ninth to twelfth terminals may correspond to four terminals of two input and output terminals of the Hall element, which is the sensor 260 for detecting the y-axis movement of the mover 300. The seventh to twelfth terminals may be formed on the other one of the two terminal units 232. As a modified embodiment, when one terminal of the two Hall elements is used as a common terminal, the total of 11 terminals may be required. As a modified embodiment, when a Hall element integrated driver IC is applied instead of a Hall element, each of the four terminals for I2C communication or when the address of each driver IC is different, only four terminals may be required.

The lens driving device may comprise a solder 235. The solder 235 may be disposed in the hole 217 of the base 210. The solder 235 may connect the first substrate 230 and the coupling member 250. The solder 235 may electrically connect the first substrate 230 and the coupling member 250. The solder 235 may couple the first substrate 230 and the coupling member 250. The solder 235 may be disposed on the first substrate 230 and the base 210. The solder 235 may be disposed on the coupling member 250 and the base 210.

The stator 200 may comprise a second substrate 240. The second substrate 240 may comprise a fine pattern coil (FP). The second substrate 240 may be disposed on the body portion 231 of the first substrate 230. The second substrate 240 may be disposed on an upper surface of the body portion 231 of the first substrate 230. The second substrate 240 may be electrically connected to the first substrate 230.

The second substrate 240 may comprise a recess 241. The recess 241 may be formed by being recessed inward from an outer periphery of the corner of the second substrate 240 to avoid wires. As a modified embodiment, the recess 241 may be omitted and a hole through which a wire passes may be formed in the second substrate 240.

The second substrate 240 may comprise a hole 242. The hole 242 may be a hollow hole penetrating the central portion of the second substrate 240 in the optical axis direction. The diameter of the hole 242 may correspond to the protrusion 213 of the base 210.

The second substrate 240 may comprise a groove 243. The groove 243 may be formed on an inner circumferential surface of the hole 242. The groove 243 of the first substrate 230 may be formed in a shape corresponding to the protrusion 214 of the base 210. The groove 243 of the second substrate 240 may be structure-coupled with the protrusion 214 of the base 210 to prevent rotation of the second substrate 240 with respect to the base 210.

The second substrate 240 may comprise a terminal 244. The terminal 244 may be formed on a lower surface of the second substrate 240. The terminal 244 may be coupled to the terminal 231b of the first substrate 230 by solder.

The stator 200 may comprise a coupling member 250. The coupling member 250 may be a base terminal inserted into the base 210. The coupling member 250 may be coupled to the base 210. The coupling member 250 may be coupled to a lower surface of the base 210.

The coupling member 250 may comprise a hole 251. The hole 251 may be a wire through hole through which a wire passes. A wire may pass through the hole 251. The coupling member 250 may be coupled to the vicinity of the hole 251 through a solder.

The coupling member 250 may comprise a coupling portion 252. The coupling member 250 may be disposed at a position corresponding to the hole 217 of the base 210. The coupling member 250 may be connected to the solder 235 connected to the first substrate 230. The coupling portion 252 may be fixed to the base 210.

The stator 200 may comprise a sensor 260. The sensor 260 may comprise a Hall sensor. The sensor 260 may comprise a Hall element. The sensor 260 may comprise a Hall IC. The sensor 260 may comprise a Hall sensor integrated driver IC. The Hall sensor may detect a magnetic force of the magnet 320. When the magnet 320 moves, the distance between the magnet 320 and the Hall sensor may be changed, accordingly the value of the magnetic force sensed by the Hall sensor may be changed. Through this, the Hall sensor may detect the position of the magnet 320 in real time.

The sensor 260 may comprise a plurality of sensors. The sensor 260 may comprise two sensors. The sensor 260 may comprise first and second sensors. The first sensor may detect movement in the x-axis direction of the mover 300, and the second sensor may detect movement in the y-axis direction of the mover 300.

The lens driving device may comprise a mover 300. The mover 300 may move with respect to the stator 200 when a current is applied to the coil 220. A lens may be coupled to the mover 300. The mover 300 may be movably disposed with respect to the stator 200. The mover 300 may move in a horizontal direction comprising the x-axis direction and the y-axis direction. The mover 300 may move in a direction perpendicular to the optical axis.

The mover 300 may comprise a holder 310. The holder 310 may be spaced apart from the base 210. The holder 310 may be integrally formed. The holder 310 may be coupled to the lens. The holder 310 may be disposed in the cover 100. The holder 310 may be formed of a material different from that of the cover 100. The holder 310 may be formed of an insulating material. The holder 310 may be formed of an injection-molded material. The outer lateral surface of the holder 310 may be spaced apart from the inner surface of the lateral plate 120 of the cover 100. A magnet 320 may be disposed on the holder 310. The holder 310 and the magnet 320 may be coupled by an adhesive. An upper elastic member 330 may be coupled to an upper surface of the holder 310. The holder 310 may be coupled to the upper elastic member 330 by heat sealing and/or adhesive. An additional elastic member may not be coupled to a lower surface of the holder 310. The adhesive bonding the holder 310 and the magnet 320 and the holder 310 and the upper elastic member 330 may be an epoxy cured by any one or more among ultraviolet (UV) light, heat, and laser. In the present embodiment, the holder 310 may have a form in which the bobbin and the housing are integrally formed.

The holder 310 may comprise a groove 311. The groove 311 may be an inner yoke insertion groove into which the inner yoke 130 is inserted. The groove 311 may be formed on an upper surface of the holder 310. The groove 311 may have a wider width than the width of the inner yoke 130. The bottom surface of the groove 311 and the lower surface of the inner yoke 130 may be spaced apart. The groove 311 may comprise a plurality of grooves. The groove 311 may comprise four grooves. The grooves 311 may be formed in a number corresponding to the number of the inner yokes 130.

The holder 310 may comprise a first protrusion 312. The first protrusion 312 may be a coupling protrusion coupled to the upper elastic member 330. The first protrusion 312 may be inserted into the hole 331a of the first coupling portion 331 of the upper elastic member 330. An adhesive may be applied to the first protrusion 312 and the first coupling portion 331 of the upper elastic member 330.

The holder 310 may comprise a protrusion 312a. The protrusion 312a may be disposed outer side of the second coupling portion 332 of the upper elastic member 330. The protrusion 312a may be protruded from an upper surface of the holder 310. The upper surface of the protrusion 312a may be disposed at a position higher than the position of the upper elastic member 330. The protrusion 312a may be a configuration for preventing deformation of the upper elastic member 330.

The holder 310 may comprise a hole 313. The hole 313 may be a wire through hole through which a wire passes. A wire may pass through the hole 313. The diameter of the hole 313 may be larger than the diameter of the wire. The hole 313 may have a wider width as it travels down at least in portion.

The holder 310 may comprise a second protrusion 314. The second protrusion 314 may be an upper stopper that mechanically restricts the upper stroke of the holder 310. The second protrusion 314 may be protruded from an upper surface of the holder 310. The second protrusion 314 may be disposed between the groove 311 of the holder 310 and the hole 313 of the holder 310. The second protrusion 314 may be overlapped with the upper plate 110 of the cover 1000 in the vertical direction (a direction parallel to the optical axis). The distance between the upper surface of the second protrusion 314 of the holder 310 and the upper plate 110 of the cover 100 may be the shortest distance between the holder 310 and the upper plate 110 of the cover 100. That is, when the holder 310 moves upward, the second protrusion 314 may collide with the upper plate of the cover 100. The second protrusion 314 may mechanically restrict an upper stroke of the holder 310.

The holder 310 may comprise a protrusion 315. The protrusion 315 may be a side portion stopper that mechanically restricts a horizontal stroke of the holder 310. The protrusion 315 may be protruded from a lateral surface of the holder 310. The protrusion 315 may be overlapped with the lateral plate 120 of the cover 100 in a horizontal direction (a direction perpendicular to the optical axis). The distance between the protrusion 315 of the holder 310 and the lateral plate 120 of the cover 100 may be the shortest distance between the holder 310 and the lateral plate 120 of the cover 100. The protrusion 315 of the holder 310 may mechanically restrict a stroke of the holder 310 in the horizontal direction.

The protrusion 315 may comprise a plurality of protrusions 315. Two protrusions 315 may be formed on each of the four lateral surfaces of the holder 310. A total of eight protrusions 315 may be formed. However, as a modified embodiment, the number of protrusions 315 may be 7 or less or 9 or more.

The holder 310 may comprise a hole 316. The hole 316 may be an adhesive injection hole for injecting an adhesive for bonding the magnet 320 to the holder 310. The hole 316 may penetrate through the holder 310 in a direction parallel to the optical axis. Through this, the hole 316 may expose an upper surface of the magnet 320. An adhesive for bonding the magnet 320 to the holder 310 may be injected through the hole 316.

The holder 310 may comprise a hole 317. The hole 317 may be a hollow hole penetrating the central portion of the holder 310 in the optical axis direction. The inner circumferential surface of the holder 310 may be formed in a curved surface. The inner circumferential surface of the holder 310 may be formed in a threaded or non-threaded type for active alignment (AA).

The holder 310 may comprise a protrusion 318. The protrusion 318 may be a lower stopper that mechanically restricts a lower stroke of the holder 310. The protrusion 318 may be overlapped with the second substrate 240 and/or the base 210 in the z-axis direction (vertical direction, height direction, and direction parallel to the optical axis). When the holder 310 moves downward, the protrusion 318 of the holder 310 may collide with any one or more of the second substrate 240 and the base 210. The protrusion 318 of the holder 310 may mechanically restrict a lower stroke of the holder 310. The protrusion 318 may comprise a plurality of protrusions. The protrusion 318 may comprise four protrusions. Four or more protrusions 318 may be formed.

The holder 310 may comprise a groove 319. The groove 319 may be a magnet accommodating groove in which the magnet 320 is disposed. The groove 319 may accommodate at least a portion of the magnet 320. The groove 319 may be formed in a shape corresponding to at least a portion of the magnet 320. The groove 319 may comprise a plurality of grooves. The groove 319 may comprise four grooves. The grooves 319 may be formed in a number corresponding to the number of the magnets 320.

The mover 300 may comprise a magnet 320. The magnet 320 may be disposed on the holder 310. The magnet 320 may be coupled to a lower side of the holder 310. The magnet 320 may be coupled to the holder 310 so that the lower surface thereof is open. The magnet 320 may face the coil 220. The magnet 320 may electromagnetically interact with the coil 220. The magnet 320 may be disposed on a sidewall of the holder 310. At this time, the magnet 320 may be a flat magnet having a flat plate shape. As a modified embodiment, the magnet 320 may be disposed at a corner between the sidewalls of the holder 310. At this time, the magnet 320 may be a corner magnet having a hexahedral shape in which the inner lateral surface is wider than the outer lateral surface.

The magnet 320 may comprise a plurality of magnets. The magnet 320 may comprise four magnets. The magnet 320 may comprise first to fourth magnets. The magnets 320 may be formed in a number corresponding to the coil 220.

The mover 300 may comprise an upper elastic member 330. The upper elastic member 330 may be coupled to the holder 310. The upper elastic member 330 may be integrally formed. A portion of the upper elastic member 330 may have a shape corresponding to a shape of a portion of the hole 316 of the holder 310. That is, the upper elastic member 330 may not be vertically overlapped with the hole 316 of the holder 310. The upper elastic member 330 may have an avoidance shape so as not to interfere with the hole 316 of the holder 310. The upper elastic member 330 may not be overlapped with the groove 311 of the holder 310 in a direction parallel to the optical axis (vertical direction). The upper elastic member 330 may comprise an avoidance shape to avoid interference with the inner yoke 130. The upper elastic member 330 may not invade the groove 311 of the holder 310. The upper elastic member 330 may comprise a first portion having a shape corresponding to the shape of a portion of the hole 316 of the holder 310. The upper elastic member 330 may comprise a spring. The upper elastic member 330 may comprise a plate spring. At least a portion of the upper elastic member 330 may have elasticity.

In the present embodiment, the upper elastic member 330 may not be used as a conductive line. That is, no current may be applied to the upper elastic member 330. However, as a modified embodiment, the upper elastic member 330 may be used as a conductive line.

The upper elastic member 330 may comprise a first coupling portion 331. The first coupling portion 331 may be coupled to the holder 310. The upper elastic member 330 may be coupled to the holder 310 in a plurality of portions. The upper elastic member 330 may be coupled to the holder 310 at eight locations.

The first coupling portion 331 may comprise a hole 331a. The hole 331a may be a coupling hole coupled to the first protrusion 312 of the holder 310. The hole 331a may be coupled to the first protrusion 312 of the holder 310. The hole 331a may have a diameter corresponding to that of the first protrusion 312 of the holder 310.

The first coupling portion 331 may comprise a cutout portion 331b. The cutout portion 331b may be extended from the hole 331a of the first coupling portion 331 to a smaller width than the hole 331a. In order to prevent rotation of the first coupling portion 331 with respect to the holder 310, an adhesive may be applied to the cutout portion 331b.

The upper elastic member 330 may comprise a second coupling portion 332. The second coupling portion 332 may be coupled to a wire. The second coupling portion 332 of the upper elastic member 330 may comprise four second coupling portions 332 corresponding to four wires. In this case, the entire upper elastic member 330 comprising the four second coupling portions 332 may be integrally formed.

The second coupling portion 332 may comprise a hole 332a. The hole 332a may be a wire through hole through which a wire passes. A wire may pass through the hole 332a. The hole 332a may be formed with a diameter larger than the diameter of the wire.

The upper elastic member 330 may comprise a connecting portion 333. The connecting portion 333 may connect the first coupling portion 331 and the second coupling portion 332. The connecting portion 333 may have elasticity. The connecting portion 333 may comprise a bent portion.

The lens driving device may comprise a lateral elastic member 400. The lateral elastic member 400 may connect the stator 200 and the mover 300. The lateral elastic member 400 may movably connect the mover 300 to the stator 200. The lateral elastic member 400 may movably connect the holder 310 to the base 210.

The lateral elastic member 400 may comprise a wire. The upper end of the wire may be coupled to the second coupling portion 332 of the upper elastic member 330 by a first solder 410. A lower end of the wire may be coupled to the coupling member 250 by a second solder 420. At this time, any one of the upper end and the lower end of the wire may be referred to as one end and the other end may be referred to as the other end. The lateral elastic member 400 may comprise a wire spring. At least a portion of the lateral elastic member 400 may have elasticity. The lower end of the wire may be connected to a base terminal inserted into the base 210. As a modified embodiment, the lower end of the wire may be connected to the first substrate 230 or the second substrate 240. In the present embodiment, the lateral elastic member 400 may not be used as a conductive line. That is, current may not be applied to the lateral elastic member 400. However, as a modified embodiment, the lateral elastic member 400 may be used as a conductive line.

The wire may comprise a plurality of wires. The wire may comprise four wires. The wire may comprise first to fourth wires. The wires may comprise four wires so that one wire may be disposed at each of the four corners of the holder 310. That is, the wire may be composed of a total of four wires. However, as a modified embodiment, five or more wires may be provided.

The lens driving device may comprise a damper (not shown). The damper may connect the upper elastic member 330 and the holder 310. The damper may connect the second coupling portion 332 of the upper elastic member 330 and the second protrusion 314 of the holder 310. The damper may prevent an oscillation phenomenon that may occur in feedback control.

Hereinafter, a method of acquiring a high-resolution image using a super-resolution (SR) technique through the lens driving device according to the present embodiment will be described with reference to the drawings.

Figure 17:
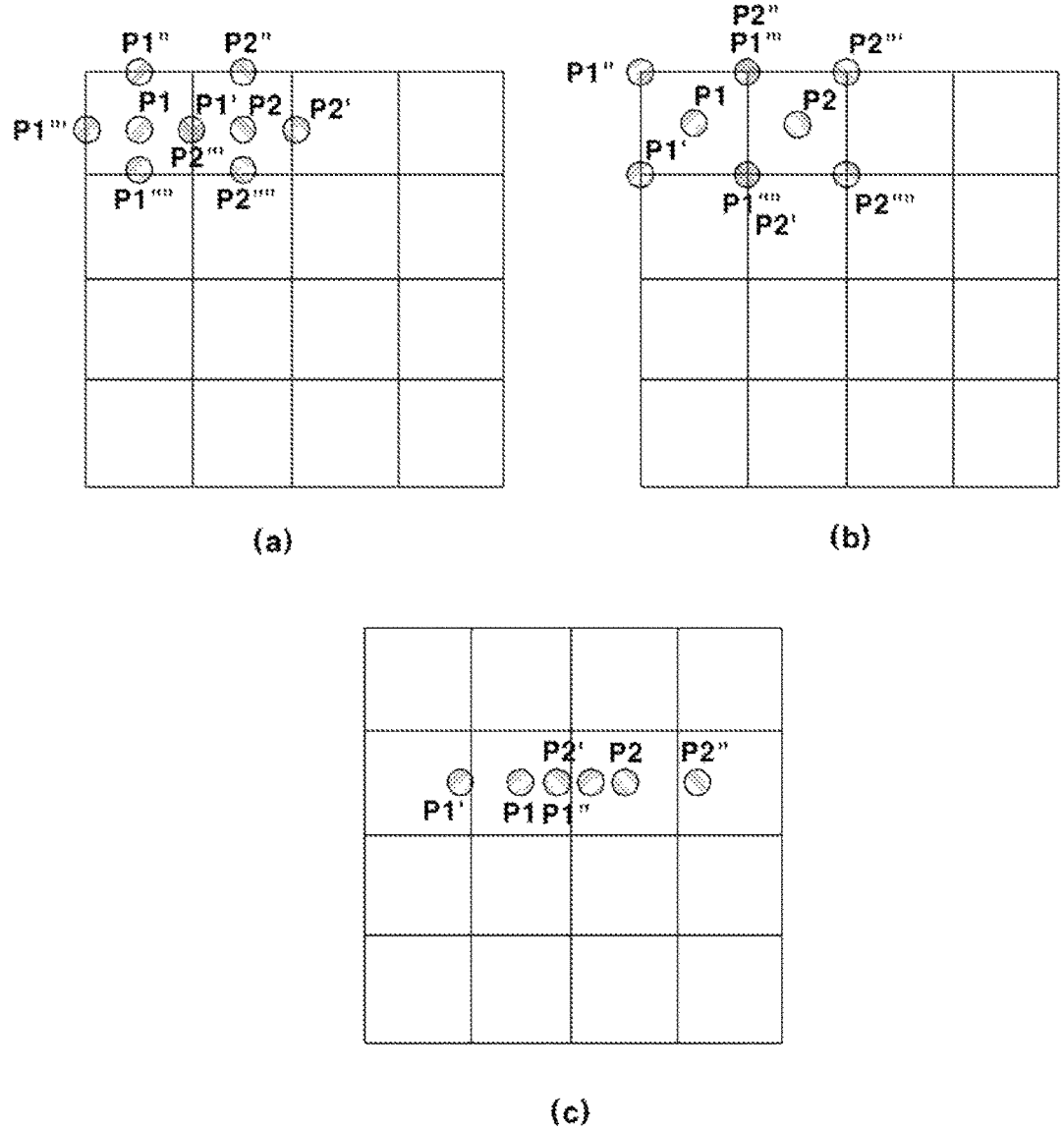
FIG. 17 is a conceptual diagram conceptually illustrating a process of acquiring a plurality of images with super resolution (SR) through a lens driving device according to the present embodiment.

FIG. 17 is a conceptual diagram conceptually illustrating a process of acquiring a plurality of images with super resolution through the lens driving device according to the present embodiment, FIG. 17(a) is a first embodiment, FIG. 17(b) is a second embodiment, and FIG. 17(c) is a third embodiment.

Although the resolution of 3D is determined according to the pixel size of the ToF sensor, as in the first embodiment of FIG. 17(a), it may be possible to improve the resolution by 4 times or more by moving the lens to secure the data for four additional positions. At this time, most of the cases being overlapped with the surroundings have two pieces of data, and in this case, a method using an average value may be appropriate. That is, in the first embodiment, P1' and P2''' may be reflected in the improvement of resolution by using the average value.

In the case of the second embodiment of FIG. 17(b), the same effect can be exhibited while increasing the driving stroke by 1.414 times compared to the first embodiment. In particular, if the OIS diagonal drive is applied, it can be driven using the current of one axis, and when applying the linear direction, it may be possible to drive by applying a current to each of the x-axis and y-axis. As in the first embodiment, in the case of overlapping data, resolution can be further increased by averaging two data in the same way.

The case of the third embodiment of FIG. 17(c) is a method of increasing the resolution by further increasing the number of data compared to the first and second embodiments. At this time, the driving stroke may be set to a value between 0.5 and 1 times compared to the pixel size.

If the moving distance is small, 1 times or more may be applied. The movement distance can be applied as an integer multiple of the sensor size or an integer multiple based on the diagonal direction.

In this embodiment, it has been described that both the lens and the magnet 320 are coupled to the holder 310, but in a modified embodiment, the holder 310 may comprise a bobbin and a housing so that the lens may be coupled to the bobbin, and the magnet 320 may be coupled to the housing. In a modified embodiment, the bobbin and the housing may be connected through an elastic member. At this time, a coil may be disposed on the bobbin, and when a current is applied to the coil, the bobbin may move in the optical axis direction (vertical direction). In a modified embodiment, the inner yoke 130 may be disposed in a groove formed on an upper surface of the bobbin. Meanwhile, in a modified embodiment, the magnet 320 may be disposed on the bobbin.

A camera device according to a modified embodiment may comprise: a printed circuit board 4; a sensor disposed on the printed circuit board 4; a base 210 disposed on the printed circuit board 4; a holder 310 spaced apart from the base 210; a lens coupled to the holder 310; a coil 220 disposed on the base 210; a magnet 320 disposed on the holder 310 and facing the coil 220; and a lateral elastic member 400 for connecting the holder 310 to the base 210. In the present modified embodiment, the lens may be tilted with respect to the sensor when a current is applied to the coil 220. That is, according to the present modified embodiment, the lens may be tilted to perform the super-resolution technique.

The coil 220 may comprise a first coil and a second coil disposed opposite with respect to the optical axis. When a current is applied to the first coil and the second coil, a repulsive force may be generated between the first coil and the magnet 320, and an attractive force may be generated between the second coil and the magnet 320. Through this, a tilt of the lens disposed on the holder 310 to which the magnet 320 is coupled may occur.

The holder 310 may comprise: a first side portion and a second side portion disposed opposite to each other; and a third side portion and a fourth side portion disposed on opposite sides of each other. The magnet 320 may comprise: a first magnet disposed on the first side portion of the holder; a second magnet disposed on the second side portion of the holder; a third magnet disposed on the third side portion of the holder; and a fourth magnet disposed on the fourth side portion of the holder. The coil may comprise: a first coil facing the first magnet; a second coil facing the second magnet; a third coil facing the third magnet; and a fourth coil facing the fourth magnet. Either one of attractive force and repulsive force may be generated between the first coil and the first magnet, and the other one of attractive and repulsive force may be generated between the second coil and the second magnet. Either one of attractive force and repulsive force may be generated between the third coil and the third magnet, and the other one of attractive and repulsive force may be generated between the fourth coil and the fourth magnet. Through this, the lens disposed on the holder 310 to which the magnet 320 is coupled may be tilted in two or more directions.

Meanwhile, the attractive force and repulsive force generated between the coil 220 and the magnet 320 may be determined by the direction of the current applied to the coil, the direction in which the coil is disposed, the direction in which the polarity of the magnet is disposed, and the like. That is, in order to obtain a desired electromagnetic force between the coil 220 and the magnet 320, the arrangement direction of the coil and the arrangement direction of the polarity of the magnet may be determined in the design process.

A camera device according to a modified embodiment may comprise: a printed circuit board 4; a sensor disposed on the printed circuit board 4; a base 210 disposed on the printed circuit board 4; a holder 310 spaced apart from the base 210; a lens coupled to the holder 310; a filter coupled to the holder 310 and disposed under the lens; a coil 220 disposed on the base 210; a magnet 320 disposed on the holder 310 and facing the coil 220; and a lateral elastic member 400 for connecting the holder 310 to the base 210. In the present modified embodiment, when a current is applied to the coil 220, the lens and the filter may be tilted together with respect to the sensor. That is, according to this modified example, the filter may be tilted to perform the super-resolution technique.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A camera device comprising:
 a printed circuit board;
 a sensor disposed on the printed circuit board;
 a cover comprising an upper plate, a lateral plate extending from an outer periphery of the upper plate, and an inner yoke extending from an inner periphery of the upper plate;
 a base coupled to the lateral plate of the cover;
 a holder spaced apart from the base;
 a coil disposed on the base;
 a magnet disposed on the holder and facing the coil;
 a lateral elastic member movably connecting the holder to the base;
 a lens having an optical axis and coupled to the holder; and
 a filter coupled to the holder and disposed between the lens and the sensor,
 wherein the holder comprises a groove formed on an upper surface of the holder,
 wherein at least a portion of the inner yoke of the cover is inserted into the groove of the holder so that the holder is hung on the inner yoke when the holder rotates,
 wherein the lens and the filter are tilted together with respect to the sensor when a current is applied to the coil, and
 wherein the lateral elastic member is disposed to be parallel to the optical axis of the lens when no current is applied to the coil.

2. The camera device of claim 1, further comprising an upper elastic member coupled to the holder,
 wherein the lateral elastic member comprises a wire,
 wherein the upper elastic member comprises a first coupling portion comprising a hole coupled to a first protrusion of the holder, a second coupling portion comprising a hole through which the wire passes, and a connecting portion connecting the first coupling portion and the second coupling portion, and
 wherein one end of the wire is coupled to the second coupling portion by a solder.

3. The camera device of claim 2, wherein the wire comprises four wires disposed on the four corners of the holder, respectively,
 wherein the second coupling portion of the upper elastic member comprises four second coupling portions corresponding to the four wires, and
 wherein the upper elastic member is integrally formed.

4. The camera device of claim 2, wherein the holder comprises a hole through which the wire passes, and a second protrusion protruding from the upper surface of the holder and disposed between the groove of the holder and the hole of the holder,
- wherein a distance between the upper surface of the second protrusion of the holder and the upper plate of the cover is the shortest distance between the holder and the upper plate of the cover, and
- wherein a damper connecting the second coupling portion of the upper elastic member and the second protrusion of the holder is disposed.

5. The camera device of claim 2, further comprising:
- a first substrate comprising a body portion disposed on the base, and a terminal portion extending downward from an outer periphery of the body portion and comprising a plurality of terminals; and
- a second substrate disposed on ab upper surface of the body portion of the first substrate and electrically connected to the first substrate,
- wherein the coil is formed as a patterned coil on the second substrate.

6. The camera device of claim 5, further comprising:
- a coupling member coupled to a lower surface of the base and comprising a hole through which the wire passes,
- wherein the base comprises a hole through which the wire passes,
- wherein the first substrate comprises a hole through which the wire passes,
- wherein the second substrate comprises a recess inwardly recessed from an outer periphery of a corner of the second substrate to avoid the wire, and
- wherein the other end of the wire is coupled to the coupling member by a solder.

7. The camera device of claim 1, wherein the holder comprises a protrusion protruding from a lateral surface of the holder,
- wherein the protrusion of the holder comprises protrusions formed by two on each of four lateral surfaces of the holder, and
- wherein a distance between the protrusion of the holder and the lateral plate of the cover is the shortest distance between the holder and the lateral plate of the cover.

8. The camera device of claim 2, wherein the holder comprises a hole penetrating the holder in a direction parallel to the optical axis to expose an upper surface of the magnet, and
- wherein a portion of the upper elastic member has a shape corresponding to a shape of a portion of the hole of the holder.

9. The camera device of claim 2, wherein the upper elastic member does not overlap with the groove of the holder in a direction parallel to the optical axis, and
- wherein the holder is integrally formed.

10. The camera device of claim 1, wherein no coil is overlapped with the magnet in a direction perpendicular to the optical axis.

11. The camera device of claim 1, wherein the lens moves together with the magnet.

12. The camera device of claim 1, wherein the coil comprises a first coil and a second coil disposed opposite to each other with respect to the optical axis, and
- wherein a repulsive force is generated between the first coil and the magnet and an attractive force is generated between the second coil and the magnet, when a current is applied to the first coil and the second coil.

13. An optical apparatus comprising:
- a main body;
- a display disposed on the main body; and
- the camera device of claim 1 disposed on the main body.

14. The camera device of claim 1, wherein the lens is coupled to the holder to move integrally with the holder, and
- wherein the holder and the magnet are coupled by an adhesive.

15. The camera device of claim 12, wherein the coil comprises a third coil and a fourth coil disposed opposite to each other with respect to the optical axis, and
- wherein a repulsive force is generated between the third coil and the magnet and an attractive force is generated between the fourth coil and the magnet, when a current is applied to the third coil and the fourth coil.

* * * * *